United States Patent
Burnell et al.

(10) Patent No.: US 9,834,314 B2
(45) Date of Patent: Dec. 5, 2017

(54) AIRCRAFT FUEL TANK INERTING SYSTEM

(71) Applicant: AIRBUS OPERATIONS LIMITED, Bristol (GB)

(72) Inventors: Stephen Burnell, Bristol (GB); Tim Leigh, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 14/831,038

(22) Filed: Aug. 20, 2015

(65) Prior Publication Data
US 2016/0052639 A1    Feb. 25, 2016

(30) Foreign Application Priority Data
Aug. 22, 2014 (GB) ................................. 1414933.0

(51) Int. Cl.
*B01D 53/22* (2006.01)
*B64D 37/32* (2006.01)
*B01D 19/00* (2006.01)

(52) U.S. Cl.
CPC ......... *B64D 37/32* (2013.01); *B01D 19/0031* (2013.01); *B01D 53/22* (2013.01); *B01D 2257/104* (2013.01); *Y02T 50/44* (2013.01)

(58) Field of Classification Search
CPC .. B01D 53/22; B01D 2053/224; B01D 63/02; B01D 2257/104; B64D 37/32
See application file for complete search history.

(56) References Cited

U.S. PATENT DOCUMENTS

| | | | | |
|---|---|---|---|---|
| 4,378,920 A | * | 4/1983 | Runnels | B64D 37/32 137/209 |
| 4,556,180 A | * | 12/1985 | Manatt | B64D 37/32 244/135 R |
| 8,245,978 B1 | | 8/2012 | Beers et al. | |
| 8,778,062 B1 | | 7/2014 | Snow, Jr. | |
| 2004/0226438 A1 | * | 11/2004 | Jones | B01D 53/22 95/45 |
| 2005/0223895 A1 | | 10/2005 | Wong | |
| 2005/0241700 A1 | | 11/2005 | Cozens et al. | |
| 2005/0247197 A1 | | 11/2005 | Snow, Jr. | |
| 2005/0279208 A1 | * | 12/2005 | Schwalm | B01D 53/22 96/4 |
| 2007/0000380 A1 | | 1/2007 | Leigh et al. | |
| 2011/0133033 A1 | | 6/2011 | Surawski | |

(Continued)

FOREIGN PATENT DOCUMENTS

| | | |
|---|---|---|
| EP | 1591359 A1 | 11/2005 |
| WO | 2005118073 A2 | 12/2005 |
| WO | 2011117610 A1 | 9/2011 |

OTHER PUBLICATIONS

UK Intellectual Property Office Search Report for Application No. GB1414933.0. Dated: Feb. 27, 2015.

(Continued)

*Primary Examiner* — Jason M Greene
(74) *Attorney, Agent, or Firm* — Hauptman Ham, LLP

(57) ABSTRACT

An aircraft fuel tank inerting system and a method of inerting an aircraft fuel tank.
The aircraft fuel tank inerting system having an on-board inerting gas generation system arranged in fluid communication between a fuel tank vent system and an aircraft fuel tank.

12 Claims, 3 Drawing Sheets

(56) References Cited

U.S. PATENT DOCUMENTS

| | | | |
|---|---|---|---|
| 2011/0151764 A1* | 6/2011 | Kastell | B64D 13/00 454/76 |
| 2012/0103192 A1* | 5/2012 | Lam | B64D 37/32 95/91 |
| 2012/0222873 A1* | 9/2012 | Kotliar | B64D 37/32 169/45 |
| 2013/0000142 A1* | 1/2013 | Tichborne | B01D 53/265 34/443 |
| 2013/0139521 A1* | 6/2013 | Massey | B64D 37/32 60/782 |
| 2014/0326135 A1 | 11/2014 | Massey et al. | |
| 2016/0052639 A1 | 2/2016 | Burnell et al. | |

OTHER PUBLICATIONS

European Search Report dated Jun. 14, 2016 EP Application No. 15184709.

European Search Report dated Jun. 7, 2016 EP Application No. 15184712.

\* cited by examiner

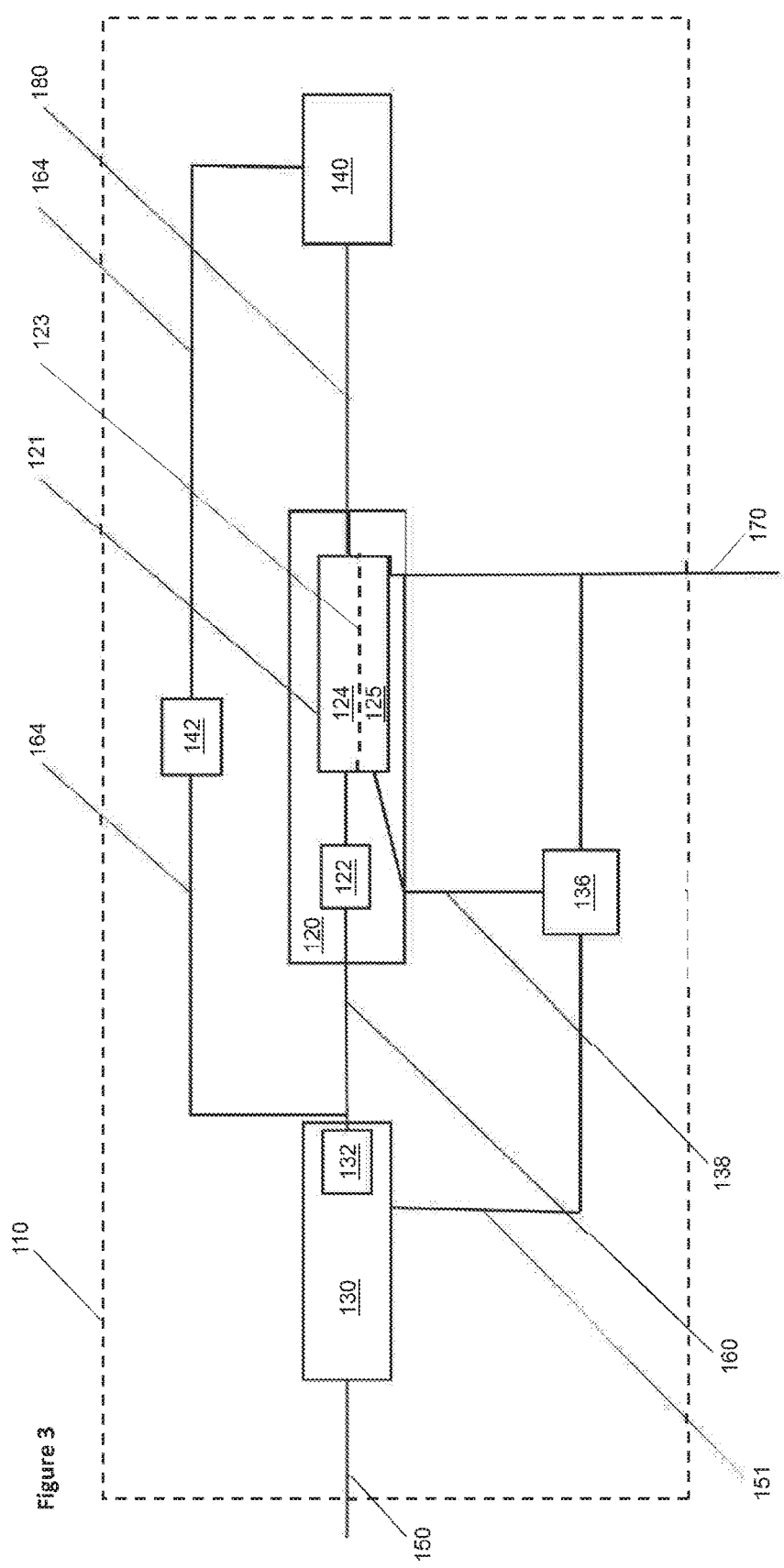

AIRCRAFT FUEL TANK INERTING SYSTEM

RELATED APPLICATIONS

The present application claims priority from Great Britain Application Number 1414933.0, filed Aug. 22, 2014, the disclosure of which is hereby incorporated by reference herein in its entirety.

The present invention relates to an aircraft fuel tank inerting system and a method of inerting an aircraft fuel tank, and in particular to an aircraft fuel tank inerting system having an on-board inerting gas generation system arranged in fluid communication between a fuel tank vent system and the aircraft fuel tank.

Certification authorities mandate that newly designed large passenger aircraft shall have ignition reduction means applied to their fuel tanks. Large passenger aircraft are generally defined as having a maximum take off weight of over 5 Tons. In the industry ignition reduction means applied to aircraft fuel tanks is commonly known as inerting. Inerting is typically implemented by filling the fuel tanks with Oxygen Depleted Air (ODA), also known as Nitrogen Enriched Air (NEA). Current large passenger aircraft fuel tank ignition reduction regulations (FAR 25.981) require that fuel tanks are kept inert with the ullage oxygen ($O_2$) concentration at or below 12%.

Known inerting solutions include the use of on-board inerting gas generation systems (OBIGGS), which take an air supply from the aircraft engine bleed air system. The on-board inerting gas generation system commonly employ an air separation module (ASM), which comprise molecular sieves enabling the air to have a proportion of its oxygen filtered off and discarded, leaving ODA to inert the aircraft fuel tanks.

As aircraft engines are typically mounted on the aircraft wings, ducting is required to provide a conduit for the bleed air from the engine, to the on-board inerting gas generation system and subsequently to the fuel tanks, which may be located in the wings or in the centre wing box. This ducting provides both a weight and a space demand on the airframe design.

Furthermore, the use of bleed air reduces engine efficiency, increasing fuel consumption.

In known methods of implementation of inerting, it is common to inert the fuel tanks during the aircraft climb phase, when the engines are at a high power setting and air is naturally rejected from the fuel tanks. These known methods replace the fuel tank ullage with ODA, however a secondary effect is that an increased amount of fuel vapour is rejected to the atmosphere as compared to a non-inerted fuel system, because of the positive external pressure created in the fuel tank.

The present invention seeks to overcome these problems. It is the object of the present invention to provide an improved aircraft fuel tank inerting system and an improved method of inerting an aircraft fuel tank.

According to the first aspect of the present invention there is provided an aircraft fuel tank inerting system having an on-board inerting gas generation system arranged in fluid communication between a fuel tank vent system and the aircraft fuel tank. Placing the on-board inerting gas generation system in-line with the fuel tank vent system, between the fuel tank vent system and the fuel tank means that only oxygen depleted air is ingested into the fuel tanks. Furthermore the coupling of the inerting and venting systems reduces the provision of ducting conduits, saving airframe space and weight.

The fuel tank vent system may include a NACA duct arranged to supply the on-board inerting gas generation system with atmospheric air. The use of atmospheric air for supplying inerting gas reduces the demand for engine bleed air and therefore enables an increase in the overall efficiency of the aircraft engines. Furthermore, atmospheric air will be ingested at temperatures which do not require conditioning, as is the case for engine bleed air. For example, the conditioning service air system (CSAS) which is bulky, heavy and expensive would not be required. The NACA duct also allows venting of the fuel tank, for example during re-fueling or as the fuel volume expands due to heating. The NACA duct also provides a slight positive pressure within the fuel tank during flight.

The on-board inerting gas generation system may comprise an air separation module. Air separation modules provide a means for continuously extracting a proportion of the oxygen from the atmospheric air to ensure a supply of ODA. Air separation modules also act to remove water vapour from the air, which provides the benefit of improved water management as all of the ingress air is at least partially dried. Furthermore, the use of atmospheric air with the air separation module means that there is no requirement for an inlet air cooling system as would be required with engine bleed air.

The NACA duct may be provided in the region of a wing tip. The ASM may be provided in the region of a wing fixed leading edge. Therefore reduced routing of inerting gas is required as compared to traditional inerting system configurations, which may commonly require ducting of bleed air from the aircraft engines (located, for example, underwing) to a CSAS, (located, for example, in the centre wingbox region), to an ASM and subsequently to the aircraft fuel tank.

The on-board inerting gas generation system may additionally comprise an air pressure reduction device. Provision of an air pressure reduction device supports function of the air separation module so that ODA can be generated at small tank-to-atmosphere differential pressures, thereby allowing an overall smaller aircraft fuel tank inerting system.

The air pressure reduction device may be a venturi based vacuum generator. Alternatively the air pressure reduction device may be a vacuum pump. These arrangements advantageously do not require the use of engine bleed air.

The fuel tank vent system may include a flame arrestor. This may be arranged between the NACA duct and the on-board inerting gas generation system. The flame arrestor acts as a heat sink to absorb the heat energy of a flame external to the wing, thereby preventing the flame from entering the fuel tank.

The aircraft fuel tank inerting system may include an air separation module filter arranged in fluid communication between the fuel tank vent system and the on-board inerting gas generation system. Provision of the filter prevents ingress of atmospheric particulates and improves the effectiveness of the air separation module.

The aircraft fuel tank inerting system may include a bypass pathway between the fuel tank vent system and the aircraft fuel tank. Such a bypass pathway provides an alternate vent pathway.

The aircraft fuel tank inerting system may include a climb/dive valve arranged in the bypass pathway between the fuel tank vent system and the aircraft fuel tank, bypassing on-board inerting gas generation system. The climb/dive valve allows air more easily to exit the tank during climb and also acts as a pressure relief valve during refuel operations.

According to the second aspect of the present invention there is provided a method of inerting an aircraft fuel tank comprising the steps of: providing an on-board inerting gas generation system in fluid communication between a fuel tank vent system and the aircraft fuel tank; supplying the on-board inerting gas generation system with atmospheric air via the fuel tank vent system; and supplying the aircraft fuel tank with inerted air from the on-board inerting gas generation system.

In use, passenger aircraft are operated in a standard flight cycle, comprising an initial parked phase (where the aircraft is fuelled and loaded with passengers and cargo, for example), a taxi phase, a take-off phase, a climb phase, a cruise phase, a descent phase, a landing phase, a return taxi phase and a final parked phase (where the aircraft is unloaded, for example).

During the standard flight cycle, atmospheric air is ingested into the vent system at varying temperatures and volume flow rates, and fuel vapour generated in the aircraft fuel tanks is exhausted via the vent system at varying flow rates, placing varying demands on the aircraft inerting system.

For example, during the descent phase, atmospheric air enters the aircraft fuel tanks at a relatively large volume flow rate as the atmospheric pressure increases due to reduction in altitude, and the reduced fuel volume due to its consumption during the taxi, take-off, climb and cruise phases. Inerting at this flight cycle phase is critical due to the high levels of fuel vapour present in the aircraft fuel tanks because of the reduced fuel volume, and the high level of oxygen content in the aircraft fuel tanks due to the atmospheric air ingested into the fuel tanks via the venting system due to the reduction in altitude. Inerting at the subsequent return taxi phase and final parked phase is also critical, given the oxygen content and fuel vapour conditions of the previous phase, coupled with the increased temperature encountered during the final parked phase, when the aircraft systems may be disabled.

Therefore whereas known methods for aircraft inerting include inerting systems that are operated throughout the standard aircraft flight cycle to ensure that there is sufficient inerting for the descent phase and final parked phase, the method of the present invention advantageously primarily provides inerting when it is needed, that is, the method provides the inert gas to the fuel tanks as air is ingested into the fuel tank vent system, primarily during descent, so that the fuel tanks are fully inert on landing. The method allows in tank oxygen concentrations of 11% or less to be achieved, so that during an overnight stop (for example), and subsequent initial parking phase, (where refueling may take place), the tank ullage remains inert.

The on-board inerting gas generation system may be supplied with atmospheric air via a NACA duct in the fuel tank vent system. The method of inerting an aircraft fuel tank may comprise the further step of providing an air separation module in the on-board inerting gas generation system; wherein the air separation module is supplied with atmospheric air via the NACA duct in the fuel tank vent system and the air separation module exhausts oxygen depleted air to the fuel tank vent system. Supplying the ASM with atmospheric air, which at cruise altitudes will commonly be in the region of −40° C. (minus forty degrees celsius) via the NACA duct means that no conditioning of the air is required to allow the ASM to function optimally.

The method of inerting an aircraft fuel tank may comprise the further steps of providing an air pressure reduction device in fluid communication with the on-board inerting gas generation system; passing a first proportion of the atmospheric air through the air pressure reduction device to produce a supply of reduced pressure air, passing a second proportion of the atmospheric air along one side of a membrane of the air separation module, exposing the other side of the membrane of the air separation module to the reduced pressure air, so that oxygen passes from the air on one side of the membrane to the reduced pressure air on the other side of the membrane, and the air separation module exhausts an oxygen depleted air to the fuel tank vent system.

Provision of a reduced pressure air on one side of a membrane of the air separation module increases the rate of extraction of oxygen in the air separation module, increases the rate of supply of inerting gas to the fuel tank.

Aspects of the present invention will now be described, by way of example only, with reference to the accompanying drawings, in which:

FIG. 3 is a block diagram of the aircraft fuel tank inerting system of a second embodiment of the present invention.

Figure 1:
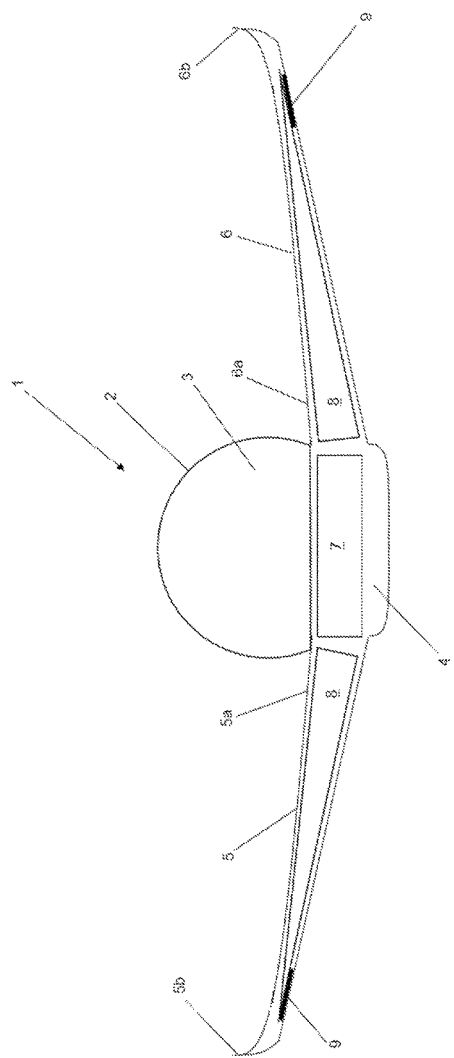
FIG. 1 is a schematic of a typical passenger aircraft cross-section taken along the aircraft wing-span at the mid plane between the aircraft nose and tail.

In FIG. 1, a large passenger aircraft 1 has a fuselage 2, divided into a pressurised cabin region 3 and a non-pressurised centre wingbox 4. A starboard and a port wing 5, 6 extend from a wing root section 5a, 6a either side of the centre wingbox 4 to respective wing tips 5b, 6b. Each wing 5, 6 houses a wing fuel tank 8. A centre wingbox fuel tank 7 is housed within the centre wingbox 4.

The wing fuel tanks 8 and centre wing fuel tank 7 are interconnected via crossfeed systems as is known in the art such that fuel may pass between the tanks 7, 8 and together the tanks 7, 8 supply fuel to the aircraft engines (not shown) and auxiliary power unit (also not shown). The tanks 7, 8 are vented to the atmosphere through respective NACA ducts 9 arranged on a lower surface of the port and starboard wings 5, 6, adjacent the respective wing tips 5b, 6b. The wing fuel tanks 8 and centre wingbox fuel tank 7 may themselves comprise multiple separate fuel cells, but for simplicity of description will be termed collectively as aircraft fuel tank 40.

Figure 2:
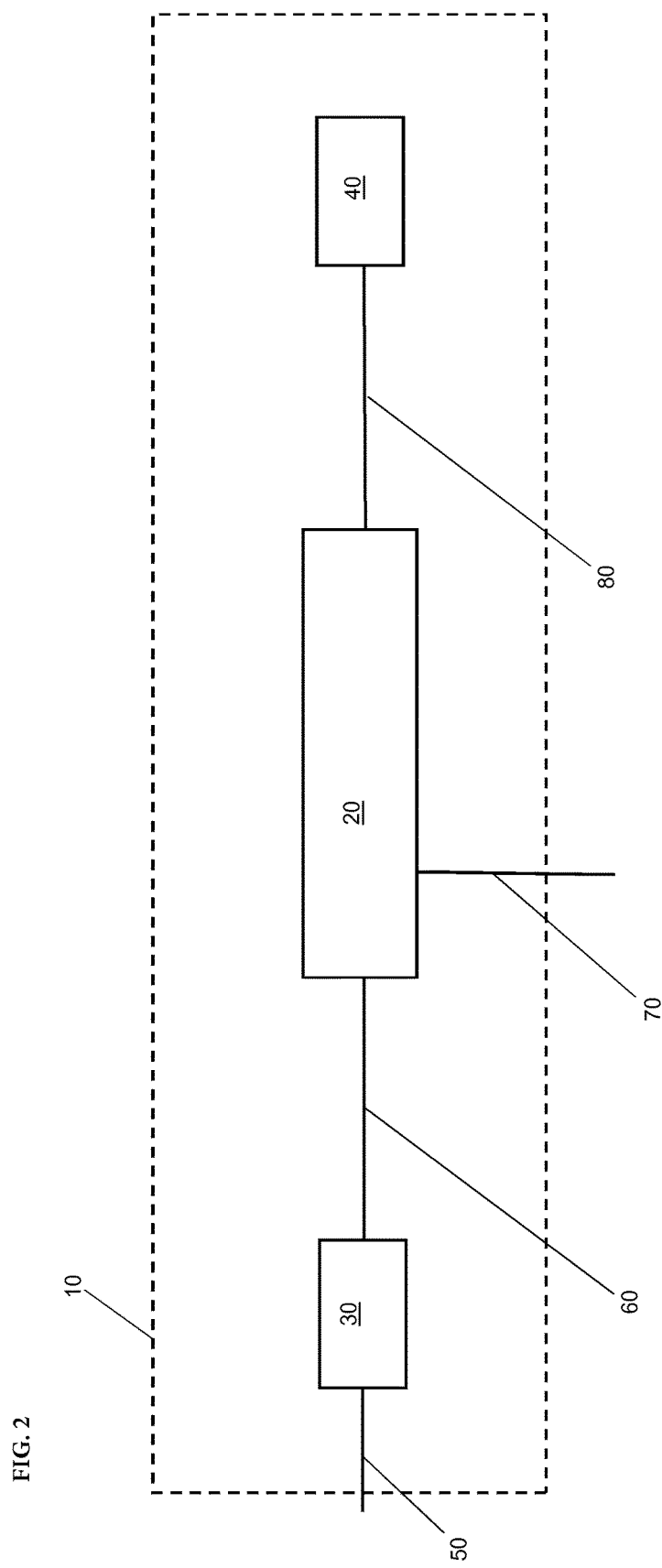
FIG. 2 is a block diagram of the aircraft fuel tank inerting system of a first embodiment of the present invention.

The aircraft fuel tank inerting system 10, (see FIG. 2) comprises an on-board inerting gas generation system 20 arranged in fluid communication between a fuel tank vent system 30 and an aircraft fuel tank 40. The on-board inerting gas generation system 20 arranged between an atmospheric opening in the fuel tank vent system 30 and the aircraft fuel tank 40.

In use, the aircraft fuel tank inerting system 10 operates as follows: the atmospheric air enters the fuel tank vent system 30 via air intake 50. The on-board inerting gas generation system 20 is supplied with atmospheric air from the fuel tank vent system 30 via atmospheric air supply conduit 60. The on-board gas generation extracts a proportion of the oxygen ($O_2$) from the atmospheric air and exhausts the remaining inert, Oxygen Depleted Air (ODA), to the aircraft fuel tank 40 via inerting gas supply conduit 80. The extracted oxygen is ejected from the on-board inerting gas generation system 20 to the atmosphere via an oxygen exhaust vent 70.

In FIG. 3, an alternate aircraft fuel tank inerting system 110 also has an on-board inerting gas generation system 120 arranged in fluid communication between a fuel tank vent system 130 and an aircraft fuel tank 140. Parts corresponding to parts in FIG. 2 bear the same reference numerals, but preceded with a "1".

The fuel tank inerting system 110 differs from the aircraft fuel tank inerting system 10 in a number of ways as will be described below.

The fuel tank vent system 130 includes a flame arrestor 132.

The on-board inerting gas generation system 120 comprises an air separation module 121, as is known in the art. The air separation module 121 includes an air separation module filter 122 arranged at its inlet. The air separation module 121 includes a molecular sieve 123 illustrated across the air separation module mid-plane, defining an inerting side 124 and an $O_2$ extraction side 125. In reality, the air separation module 121 comprises a cylindrical conduit packed with hollow fibres. The walls of the fibres provide the molecular sieve, generally termed 123, which separates the channels within the hollow fibres, collectively designated as inerting side 124 and the regions external to the hollow fibres, collectively designated as $O_2$ extraction side 125.

The fuel tank inerting system 110 further includes an air pressure reduction device 136. The air pressure reduction device 136 is a vacuum generator, the function of which will be described in more detail below.

The fuel tank inerting system 110 further includes a climb/dive valve 142 as is known in the art, the function of which will be described in more detail below.

In use, the aircraft fuel tank inerting system 110 operates as follows: the atmospheric air enters the fuel tank vent system 130 via air intake 150. A proportion of the atmospheric air is routed from the flame arrestor 132 in the fuel tank vent system 130 to the air separation module filter 122 via supply conduit 160. The remainder of the atmospheric air is routed from the fuel tank vent system 130 to the air pressure reduction device 136 via conduit 151.

The air separation module filter 122 removes atmospheric particulates to provide a filtered atmospheric air supply from conduit 162 to the inerting side 124 of air separation module 121. The air separation module in the on-board inerting gas generation system 120 is thereby supplied with filtered atmospheric air.

The air pressure reduction device 136 is venturi based, and generates a supply of reduced pressure air by passing the remainder of the atmospheric air through a constriction. The reduced pressure air is exposed to the $O_2$ extraction side 125 of the air separation module 121 by conduit 138.

In use, the filtered atmospheric air is supplied from conduit 162 to the inerting side 124 of the molecular sieve 123, and the reduced pressure air is exposed to the $O_2$ extraction side 125 of the molecular sieve 123 by conduit 138. This arrangement boosts the pressure differential across the molecular sieve 123 to increase the rate of extraction of oxygen across the molecular sieve 123 from the inerting side 124 to the $O_2$ extraction side 125. The extracted oxygen is collected on the $O_2$ extraction side 125 of the air separation module 121 and ejected to the atmosphere via an oxygen exhaust vent 170. The remaining inert, Oxygen Depleted Air (ODA), is supplied from the inerting side 124 of the air separation module 121 to the aircraft fuel tank 140 via inerting gas supply conduit 180.

The climb/dive valve 142 provides a bypass 164 from the aircraft fuel tank 140 to the supply conduit 160 between the flame arrestor 132 and the air separation module filter 122.

In use, the climb/dive valve 142 provides an additional vent pathway from the fuel tank 140 when necessary, for example during ascent or during refuel operations, by opening to allow fuel vapour to exit the fuel tank 140 via the bypass 164. The climb/dive valve 142 also provides relief by opening during descent if insufficient inerting gas is supplied to the fuel tank 140 from the on-board inerting gas generation system 120, to prevent the fuel tank pressure to atmospheric pressure differential from exceeding a pre-determined value.

In an alternate embodiment, a vacuum pump may be used as an air pressure reduction device.

The invention claimed is:

1. An aircraft fuel tank inerting system having an on-board inerting gas generation system arranged in fluid communication between a fuel tank vent system and the aircraft fuel tank, wherein the fuel tank vent system includes a NACA duct arranged to supply the on-board inerting gas generation system with atmospheric air and wherein the on-board inerting gas generation system additionally comprises an air pressure reduction device.

2. The aircraft fuel inerting system of claim 1 wherein the on-board inerting gas generation system comprises an air separation module.

3. The aircraft fuel inerting system of claim 1 wherein the air pressure reduction device is a venturi based vacuum generator.

4. The aircraft fuel inerting system of claim 1 wherein the air pressure reduction device is a vacuum pump.

5. The aircraft fuel inerting system of claim 1 wherein the fuel tank vent system includes a flame arrestor.

6. The aircraft fuel inerting system of claim 1 having an air separation module filter arranged in fluid communication between the fuel tank vent system and the on-board inciting gas generation system.

7. An aircraft fuel tank inerting system having an on-board inerting gas generation system arranged in fluid communication between a fuel tank vent system and the aircraft fuel tank, the aircraft fuel tank inerting system further comprising an alternate vent pathway between the fuel tank vent system and the aircraft fuel tank.

8. The aircraft fuel inerting system of claim 7 having a climb/dive valve arranged in the alternate vent pathway between the fuel tank vent system and the aircraft fuel tank, bypassing the on-board inerting gas generation system.

9. An aircraft having the aircraft fuel inerting system of claim 1.

10. A method of inerting an aircraft fuel tank comprising the steps of:
providing an on-board inerting gas generation system in fluid communication between a fuel tank vent system and the aircraft fuel tank;
providing an air pressure reduction device in fluid communication with the on-board inerting gas generation system;
supplying the on-board inerting gas generation system with atmospheric air via the fuel tank vent system, wherein the on-board inerting gas generation system is supplied with atmospheric air via a NACA duct in the fuel tank vent system; and
supplying the aircraft fuel tank with inerted air from the on-board inerting gas generation system.

11. A method of inerting an aircraft fuel tank according to claim 10 further comprising the step of:
providing an air separation module in the on-board inerting gas generation system; wherein the air separation module is supplied with atmospheric air via the NACA duct in the fuel tank vent system and the air separation module exhausts oxygen depleted air to the fuel tank.

12. A method of inerting an aircraft fuel tank according to claim 10 comprising the further steps of:

passing a first proportion of the atmospheric air through the air pressure reduction device to produce a supply of reduced pressure air passing a second proportion of the atmospheric air along one side of a membrane of the air separation module, exposing the other side of the membrane of the air separation module to the reduced pressure air, so that oxygen passes from the air on one side of the membrane to the reduced pressure air on the other side of the membrane and the air separation module exhausts an oxygen depleted air to the fuel tank.

\* \* \* \* \*